United States Patent Office 3,343,077
Patented Sept. 19, 1967

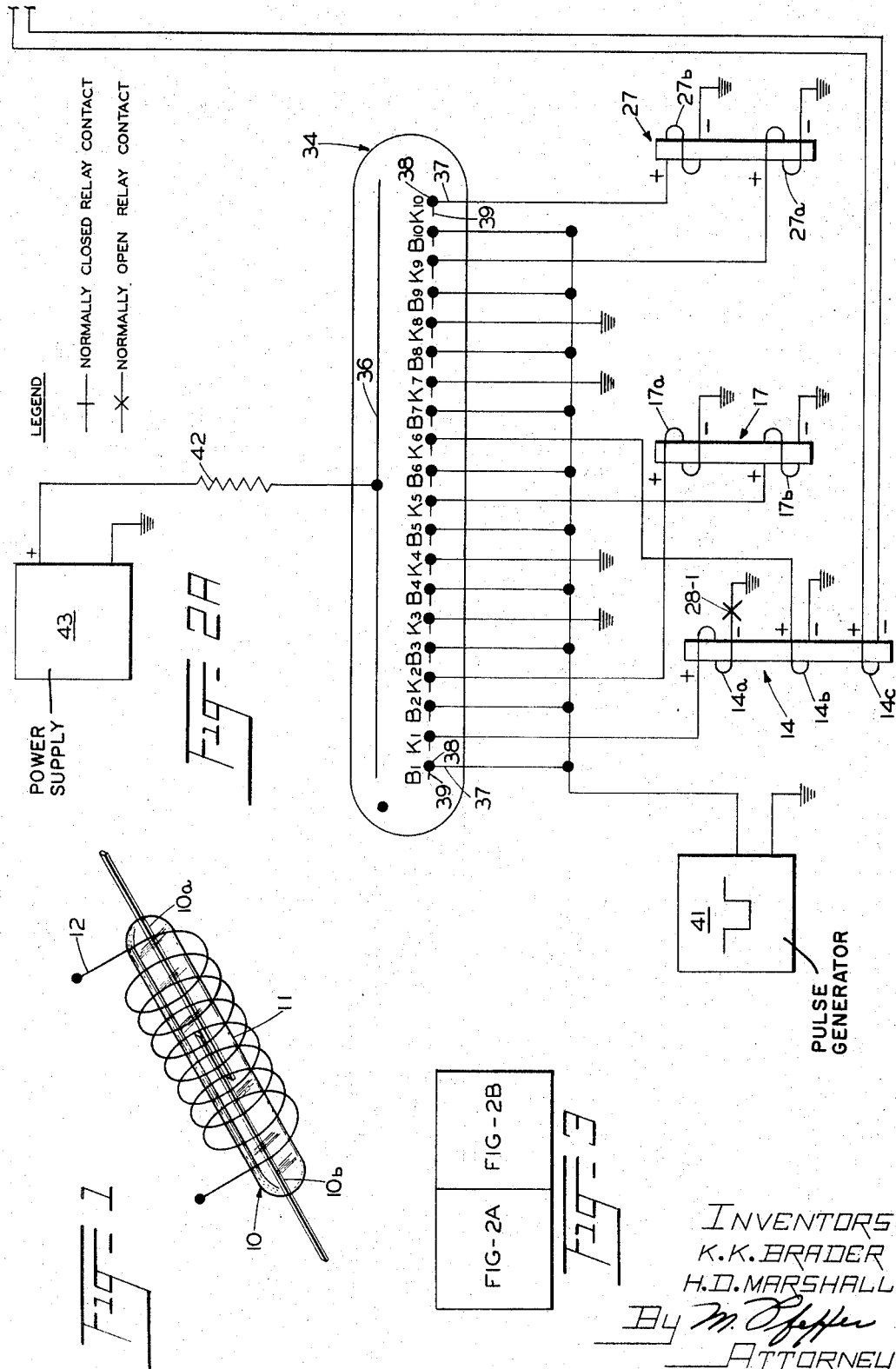

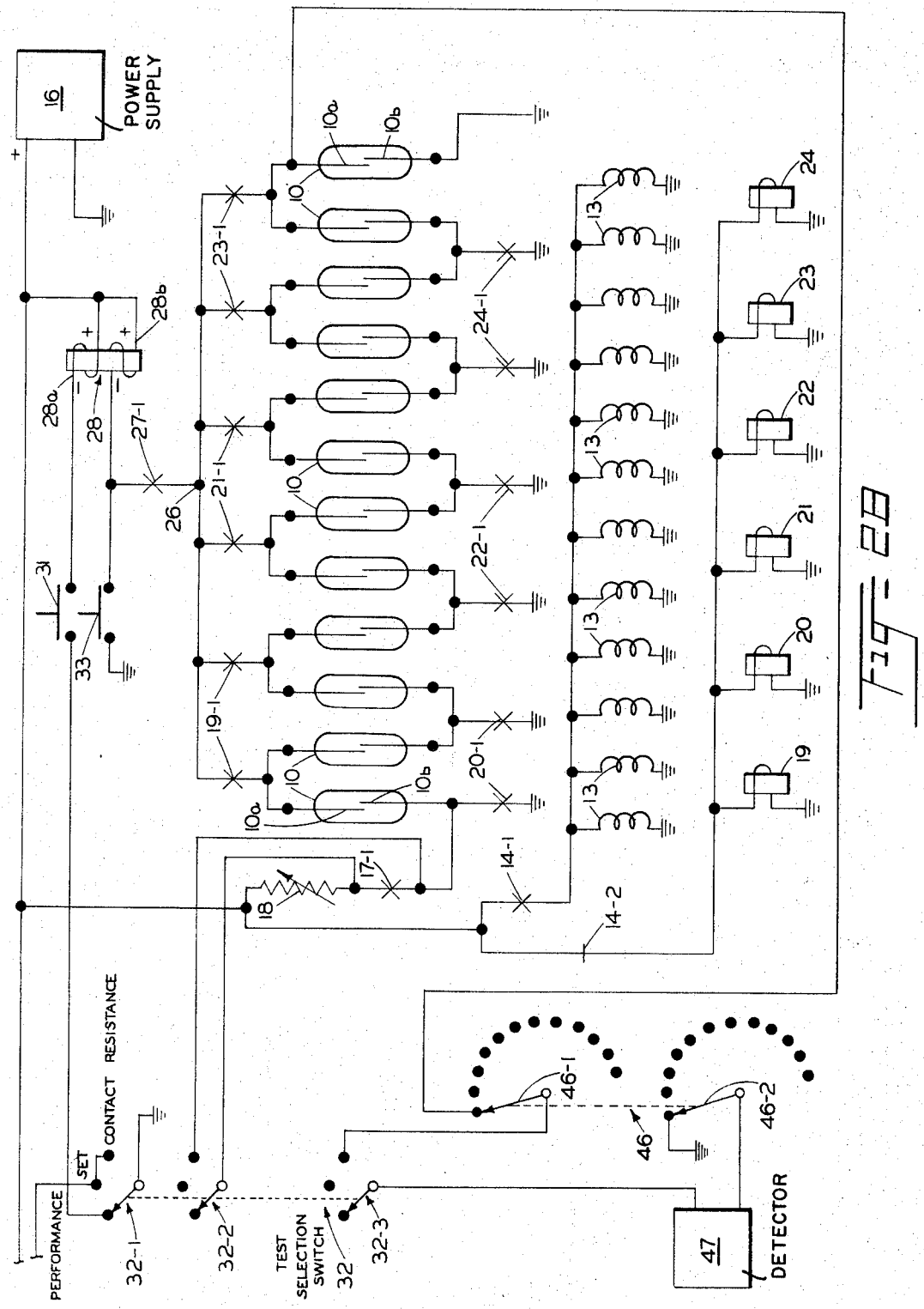

3,343,077
METHODS OF AND APPARATUS FOR SERIES-PARALLEL TESTING OF ELECTRICAL COMPONENTS
Kenneth K. Brader, Catasauqua, and Howard D. Marshall, Stroudsburg, Pa., assignors to Western Electric Company, Incorporated, New York, N.Y., a corporation of New York
Filed Dec. 17, 1963, Ser. No. 331,650
12 Claims. (Cl. 324—28)

ABSTRACT OF THE DISCLOSURE

Electrical components are initially connected in series and subjected to a test current, whereafter the components are connected in parallel and subjected to a voltage to detect a change in characteristic due to the test current. In one application, the components are miniature sealed reed switches and the characteristic detected is the resultant fusing of the contacts subjected to the test current.

---

This invention relates to methods of and apparatus for testing electrical components and, more particularly, to methods of and apparatus for simultaneously testing a plurality of electrical components.

In the manufacture of certain type electrical components it is necessary that sample groups of the components be subjected to some form of life testing. For example, in the manufacture of miniature sealed contact switches, each of which includes a pair of magnetizable contacts disposed within a hermetically sealed glass envelope in a manner such that upon the application of a magnetic field the contacts close and provide a very low resistance path, a sample group of switches from each manufacturing lot is subjected to a predetermined number of contact openings and closings. During each closure period, a prescribed current is passed through each switch. If this current results in the contacts of any one of the switches of the sample group fusing, the entire lot from which the sample has been selected, is considered defective and, hence, is rejected. Additionally, the contact resistance of each switch is checked after a predetermined number of operations to determine whether it is greater than or less than a predefined value, any switch having a contact resistance greater than the predefined value resulting in rejection of the entire manufacturing lot.

It is an object of this invention to provide new and improved methods of and apparatus for accomplishing the foregoing described testing.

It is another object of this invention to provide new and improved methods of and apparatus for testing electrical components in an expeditious, accurate and reliable manner.

It is a further object of this invention to provide new and improved methods of and apparatus for simultaneously testing a plurality of electrical components.

It is a still further object of this invention to provide new and improved methods of and apparatus for simultaneously testing a plurality of electrical components in a cyclic manner.

It is another object of this invention to provide methods of and apparatus for testing electrical components wherein a gas discharge stepping tube is employed.

Generally, gas discharge stepping tubes of the type contemplated by the invention include an anode and a plurality of cathodes some of which are designated as "output" or "K" cathodes and others of which are designated as "stepping" or "B" cathodes. All of the cathodes are of the preferential type and are arranged in a circular array with each "K" cathode being interposed between two "B" cathodes. Advantageously, all of the "B" cathodes are connected to a common pulse input lead and the "K" cathodes are connected either directly to ground or through some intermediate component(s) to ground, the common anode being connected to a positive D.C. supply through a series impedance. In normal operation, a glow existing between the anode and one of the "K" cathodes can be transferred to the next succeeding "K" cathode by applying a negative pulse to the common pulse input lead, the glow extinguishing from the first "K" cathode and transferring to the next succeeding "B" cathode during the application of the pulse and then transferring to the second "K" cathode upon the expiration of the pulse.

One of the problems encountered in the use of these tubes resides in stepping the glow to any predetermined cathode and maintaining it thereat. Of course, this can be accomplished by only applying a predetermined amount of pulses to the "B" cathodes. However, this involves relatively complicated circuitry. Another approach is to employ the use of an "auxiliary" or "reset" cathode, the glow immediately transferring to this cathode from any other cathode upon the application of a reset signal thereto. Accordingly, this approach does not enable the conclusion of the normal cycle of the tube, which is extremely important in many switching applications, particularly in the instant invention.

It is, therefore, a feature of this invention to provide a novel and unique manner of operating a gas discharge stepping tube to enable the glow to be stepped to any position of the tube and be maintained thereat.

It is another feature of this invention to provide a new and improved manner of operating a gas discharge stepping tube wherein a signal applied to the tube during any portion of its normal cycle will result in the glow returning to its starting position after first completing the normal cycle.

A method of testing a plurality of electrical components illustrating certain features of the invention may include the steps of placing the components in electrical series relationship with one another to form a series network, passing a predetermined test current through said series network, placing said components in electrical parallel relationship, and sensing a characteristic of said components when they are connected in parallel with one another to determine the effect of the test current passing therethrough.

Apparatus for testing a plurality of electrical components illustrating certain features of the invention may include means for sequentially placing the components in an electrical series relationship and in an electrical parallel relationship. Means are provided for passing a predetermined test current through the components while they are connected in electrical series relationship with one another. Means are also provided for sensing a characteristic of the components while they are connected in electrical parallel relationship with one another to determine the effect of the test current passing therethrough.

A complete understanding of the invention may be had from the following detailed description of a specific embodiment thereof, when read in conjuction with the appended drawings, in which:

FIG. 1 is an enlarged view of a miniature sealed contact switch which may advantageously be tested according to the invention;

FIGS. 2A and 2B, combined, illustrate schematically an embodiment of the invention; and FIG. 3 is a diagramatic view showing how FIGS. 2A and 2B are arranged to complete the schematic illustration of the invention.

Illustratively, the invention will be described as being employed to test a plurality of miniature sealed contact switches. As seen in FIG. 1, a miniature sealed contact switch 10 includes a pair of contacts 10a and 10b of magnetizable material disposed in overlapping and spaced relationship within a hermetically sealed glass envelope 11. Advantageously, the envelope 11 is filled with a protective gas to prevent oxidation and/or other deterioration of the surface of the contacts 10a and 10b. Upon application of a magnetic field to the switch 10, such as, for example, by energizing a coil 12 disposed about the switch, the contacts 10a and 10b thereof become magnetized and engage each other.

The switch 10 has been designed to have a high reliability, that is, it has been designed to have a relatively long life expectancy. In order to determine whether each switch 10 has the requisite reliability, a sample group from each manufacturing lot is subjected to a type of life testing. In the present instance, this takes the form of randomly selecting twelve switches from a manufacturing lot of a thousand and subjecting the selected switches to approximately a million and a half operations, i.e., openings and closings, one hundred and twenty-five milliamps of current being passed through each switch during each closure period. Statistically, it has been determined that, if the contacts of any one of the twelve switches fuse together during the foregoing testing, the entire lot of a thousand is considered defective and, hence, is scrapped.

Further, at predetermined intervals during the testing, also statistically determined, the switches are checked to determine their contact resistance. If at any of these checks the contact resistance of any one of the twelve switches is greater than a predetermined value, the entire lot of a thousand switches from which the sample of twelve has been chosen is rejected.

Referring now to FIGS. 2A and 2B, combined, as depicted in FIG. 3, there is shown apparatus for simultaneously testing twelve sealed contact switches 10—10 in accordance with the above-described test requirements. The switches 10—10 are provided with respective energizing coils 13—13, all of which are connected in parallel with one another. The parallel network thus formed is connected in an energizing circuit which includes a normally open contact 14–1 of a relay 14 and a D.C. power supply 16. As is readily seen, the contacts 10a—10a and 10b—10b of the switches 10—10 are interconnected in a manner such that the switches are normally connected in series with one another and form a series network. This series network, in turn, is connected in a current applying circuit which includes a normally open contact 17–1 of a relay 17, a variable resistor 18, and the power supply 16.

Additionally, the contacts 10a—10a and 10b—10b of the switches 10—10 are connected to sets of normally open contacts 19–1 to 24–1 of six relays 19–24 in a manner such that when the relays 19–24 are energized the switches 10—10 are placed in parallel with one another, that is, all of the contacts 10a—10a of the switches 10—10 are connected to a junction point 26 and all of the contacts 10b—10b are connected to ground. The relays 19–24 are connected in an energizing circuit which includes a normally closed contact 14–2 of the relay 14 and the power supply 16. The junction point 26 is connectable through a normally open contact 27–1 of a relay 27 and a first operating coil 28a of a relay 28 to the power supply 16. A second operating coil 28b of the relay 28 has one end connected to the power supply 16 and the other end connectable through a normally open "Start" pushbutton switch 31 and the "Performance" position of a first deck 32–1 of a "Test Selection" switch 32 to ground. The point intermediate the coil 28a of the relay 28 and the normally open contact 27–1 of the relay 27 is connectable to ground through a normally open "Stop" pushbutton switch 33.

The relays 14, 17, 27 and 28 are of the type commonly referred to as polarized, magnetic latching relays. Each of the relays 14, 17, 27 and 28 is provided with multiple operating coils, energization of any one thereof with current of a predetermined polarity causing a transfer of the relay armature from engagement with one set of contacts to engagement with another set of contacts, the armature remaining in engagement with the second set of contacts after removal of energizing current from an operating coil by virtue of magnetic latching. Transfer of the armature back to the first set of contacts is accomplished by either passing energizing current in a reverse direction through the previously energized operating coil or through another one of the operating coils associated with the relay.

The apparatus is also provided with a multi-element, cold cathode, gas discharge stepping tube 34, such as a Western Electric type 439A. Generally, the tube 34 includes an anode 36 and a plurality of cathodes 37—37, in the present instance, twenty, each of the cathodes 37—37 being of the preferential type, that is, each having portions 38 and 39 of high and low glow discharge efficiency, respectively. Ten of the cathodes are referred to as "output" or "K" cathodes and are given the designations $K_1$–$K_{10}$, and ten are referred to as "stepping" or "B" cathodes and are given the designations $B_1$–$B_{10}$. All of the cathodes 37—37 are mounted within the tube envelope in a circular array with each "K" cathode being interposed between two "B" cathodes and with the portion of low discharge efficiency 39 of one cathode 37 being adjacent to the portion of high discharge efficiency 38 of the preceding cathode 37. All of the "B" cathodes $B_1$–$B_{10}$ are connected to each other and to a suitable source of negative pulses, such as a pulse generator 41. The anode 36 is connected through an anode resistor 42 to a D.C. power supply 43. The cathodes $K_3$, $K_4$, $K_7$ and $K_8$ are connected directly to ground. The cathode $K_1$ is connectable through a first operating coil 14a of the relay 14 and a normally open contact 28–1 of the relay 28 to ground, and the cathode $K_6$ is connected through a second operating coil 14b of the relay 14 to ground. The cathodes $K_2$ and $K_5$ are connected to ground through first and second operating coils 17a and 17b of the relay 17, respectively, and cathodes $K_9$ and $K_{10}$ are connected to ground through first and second operating coils 27a and 27b of the relay 27, respectively.

As is well known, in normal use of the stepping tube 34, prior to pulses being applied to the "B" cathodes, a glow will be initiated between the anode 36 and one of the "K" cathodes, e.g., cathode $K_1$. The anode resistor 42 is selected so that upon establishment of the glow the voltage at the anode 36, because of the current through the anode resistor, falls to a value which is too low to cause initiation of a glow between the anode and any of the other cathodes, but is not so low that the first glow will be extinguished. Upon application of a negative pulse to the "B" cathodes a glow will be established between the anode 36 and the cathode $B_2$ because of the preferential construction of the cathodes 37—37. The resultant increase in the current through the anode resistor 42 causes the potential at the anode 36 to drop to a value which is too low to maintain a discharge between the anode and cathode $K_1$ and, accordingly, the glow at the cathode $K_1$ is extinguished. At the expiration of the pulse, the glow on cathode $B_2$ is extinguished and a glow is established between the anode and the cathode $K_2$. In a like manner, successive pulses will effect transfer of the discharge from one "K" cathode to the next succeeding "K" cathode.

In some uses of a stepping tube, particularly in the instant situation, it is desirable to be able to step the glow to a particular position of the tube (each "K" cathode and its corresponding "B" cathode defining a position of the tube) and maintain it thereat without stopping the train of pulses to the "B" cathodes and without causing the glow to deviate from its normal cycle. Heretofore, as pointed out previously, this has required complicated associated circuitry. Alternatively, a "reset" cathode has been employed; however, this cathode when energized transfers the glow immediately thereto and thus, unless additional circuitry is provided to synchronize the actuation thereof in accordance with a predetermined timed relationship, will not allow the glow to complete its normal cycle.

According to one aspect of the present invention, the glow is caused to be stepped to a particular position and maintained thereat in a unique manner by opening up the "K" cathode circuit associated with this position and selecting a pulse source 41 having an output impedance between pulses of a value which will maintain a glow discharge between a "B" cathode and the anode 36. For example, assume that a glow has been established on cathode $K_{10}$ and that contact 28–1 in the $K_1$ cathode circuit is in the position shown, i.e., cathode $K_1$ is open. A negative pulse applied to cathode $B_1$ will, therefore, transfer the glow thereto in the manner previously described. Upon cessation of the pulse the glow will not transfer to the cathode $K_1$ because it is open but will, instead, remain on cathode $B_2$ since the output impedance of the pulse source 41 during its off time is of a value such that the voltage from the anode 36 to cathode $B_2$ is above that necessary to maintain a glow discharge.

In considering the operation of the apparatus, it will be assumed that prior to initiation of the testing the glow is on the cathode $B_1$ and the only relays energized are the switch paralleling relays 19–24. To initiate the test the "Start" pushbutton switch 31 is depressed to pass energizing current through the operating coil 28b of the relay 28, the path for this energizing current being traced from the positive terminal of the power supply 16 through the operating coil 28b, the "Start" pushbutton switch 31 and the "Performance" position of the first deck 32–1 of the "Test Selection" switch 32 to ground. This results in closure of the contact 28–1. Accordingly, upon the application of the next negative pulse to the "B" cathodes, the glow is transferred from the cathode $B_1$ to the cathode $K_1$ thereby passing energizing current through the operating coil 14a of the relay 14. Energization of the relay 14 closes the contact 14–1 and opens the contact 14–2. Opening of the contact 14–2 de-energizes the switch paralleling relays 19–24 while closure of the contact 14–1 passes energizing current through the operating coils 13—13 of the switches 10—10. This places the contacts 10a—10a and 10b—10b of the switches 10—10 in series with one another.

The next pulse from the pulse source 41 steps the discharge to the cathode $K_2$ and passes energizing current through the operating coil 17a of the relay 17. Energization of the relay 17 causes closure of the contact 17–1 which, in turn, results in a predetermined current being passed through the serially connected contacts 10a—10a and 10b—10b, the path therefor being traced from the positive terminal of the power supply 16 through the variable resistor 18, the contact 17–1 and the contacts 10a—10a and 10b—10b to ground. It should be noted that applying the predetermined current to all of the contacts 10a—10a and 10b—10b in series assures that each switch 10 is tested under identical conditions.

The next three pulses step the discharge through the cathodes $K_3$ and $K_4$ to the cathode $K_5$, whereupon the operating coil 17b of the relay 17 is energized to open the contact 17–1 thereby disabling the current path for the contacts 10a—10a and 10b—10b. It should be noted that the purpose of stepping the discharge through the cathodes $K_3$ and $K_4$ before opening the current path at cathode $K_5$ is to provide a predetermined interval of current application.

The discharge is then stepped to cathode $K_6$ whereat the operating coil 14b of the relay 14 is energized to open the contact 14–1 and close the contact 14–2. This results in a removal of energizing power from the operating coils 13—13 of the switches 10—10 to open the contacts 10a—10a and 10b—10b, and an energization of the switch paralleling relays 19–24 to place the switches in parallel with one another.

The next three pulses step the discharge through cathodes $K_7$ and $K_8$ to cathode $K_9$ whereupon the operating coil 27a of the relay 27 is energized to close the contact 27–1. Closure of the contact 27–1 conditions an energizing circuit for the operating coil 28a of the relay 28, the path for this conditioned energizing circuit being traced from the positive terminal of the power supply 16 through the operating coil 28, the closed contact 27–1, the junction point 26 and the parallel network of switches 10—10 to ground. As is readily seen, if all the switch contacts 10a—10a and 10b—10b have opened after removal of power from their respective operating coils at cathode $K_6$, the parallel network will present an open circuit between the junction point 26 and ground and, accordingly, no energizing current will be passed through the operating coil 28a of the relay 28. If, however, the contacts 10a and 10b of one or more of the switches 10—10 have fused together as a result of the application of current at the cathodes $K_2$, $K_3$ and $K_4$ a low impedance path will be present between the junction point 26 and ground. This, of course, will result in energization of the operating coil 28a of the relay 28 and an opening of the previously closed, normally open contact 28–1 to open the $K_1$ cathode circuit. It should be noted that the reason for stepping the discharge through cathodes $K_7$ and $K_8$ before conditioning the energizing circuit for the operating coil 28a is to allow a sufficient time for opening of the contacts 10a—10a and 10b—10b.

The next succeeding pulse steps the discharge to cathode $K_{10}$ whereat energizing current will be passed through the operating coil 27b of the relay 27 to open the contact 27–1 and thereby remove power from the junction point 26.

If the contact 28–1 were opened at cathode $K_9$ then, as previously pointed out, the discharge, upon the application of the next pulses will be stepped to cathode $B_1$ and will remain thereat indefinitely. If, however, the contact 28–1 were not opened at cathode $K_9$, the discharge, upon the application of the next pulse will be transferred from the cathode $K_{10}$ through the cathode $B_1$ to the cathode $K_1$, whereupon the aforedescribed "Performance" test cycle will be repeated until expiration of a prescribed test interval or occurrence of a fused switch.

As has been previously pointed out, it is also necessary to periodically check the contact resistance of each switch 10. Because of the small value of this contact resistance it is desirable to employ a four terminal measuring technique, that is, to apply a predetermined current through each switch 10 and measure the voltage developed thereacross. To accomplish this, it is first necessary to stop the "Performance" test cycle. This is readily achieved by depressing the "Stop" pushbutton switch 33 to energize the operating coil 28a of the relay 28 and open the contact 28–1 thereof; accordingly, the glow upon reaching cathode $B_1$ will stop. The "Test Selection" switch 32 is now thrown to the "Set" position thereof, whereupon energizing current is passed through a third operating coil 14c of the relay 14, the path therefor being traced from the positive terminal of the power supply 16 through the operating coil 14c, the "Set" position of the first deck 32–1 of the "Test Selection" switch 32 to ground. Energization of the relay 14 causes an opening of the contact 14–2 and a closing of the contact 14–1 to de-energize the switch-paralleling relays 19–24 and to energize the operating coils 13–13 of the switches 10–10, respectively. Accordingly, the contacts 10a—10a and 10b—10b are placed in series with one another. The "Test Selection" switch 32 is now thrown to the "Contact Resistance" position thereof. This places a short across the contact 17–1 through the "Contact Resistance" position of a second deck 32–2 of the "Test Selection" switch 32 and thereby passes a predetermined current through the serially connected contacts 10a—10a and 10b—10b.

To measure the contact resistances of the switches 10—10, each 10a contact thereof is led to one position of a first deck of a rotary selector switch 46 and each 10b contact thereof is led to a corresponding position on a second deck of the switch 46. For the sake of clarity, connections from only one of the switches 10—10 to the rotary selector switch 46 have been shown. A wiper 46–1 of the switch 46 is connected through the "Contact Resistance" position of a third deck 32–3 of the "Test Selection" switch 32 to one input terminal of a conventional detector 47, which compares the voltage developed across each switch 10 to a predetermined value, and a wiper 46–2 of the switch 46 is connected directly to the other input terminal of the detector 47. The contact resistances of the switches 10–10 are measured by rotating the selector switch 46 through each of its positions. Continuation of the performance testing of the switches 10—10, is readily accomplished by returning the "Test Selection" switch 32 to its "Performance" position and thereafter depressing the "Start" pushbutton switch 31.

It should be noted that the stepping tube 34 always completes its normal cycle before stopping. This complete cycle-before-stopping mode of operation assures that the latching relays 14, 17, 27 and 28 are reset at the initiation of each performance test cycle. Accordingly, the switches 10—10 are never operated, i.e., opened or closed, while connected in an active circuit.

It is to be understood that the above-described embodiment is merely illustrative of the principles of the invention. Other embodiments may be devised by a person skilled in the art which embody these principles and fall within the spirit and scope thereof.

What is claimed is:

1. The method of simultaneously testing a plurality of contact switches having respective operating coils, which comprises the steps of:
   alternately placing said switches in electrical series relationship with one another and in electrical parallel relationship with one another;
   sequentially energizing and de-energizing the operating coils of said switches when said switches are connected in series with one another to sequentially close and open the contacts thereof;
   passing a predetermined test current through the contacts of said switches when the operating coils thereof are energized;
   applying a voltage to said switches when they are connected in parallel with one another, the amount of resultant current depending upon the effect of said test current on said contacts; and
   sensing the amount of resultant current during the voltage applying step to determine the effect of said test current on the contacts of said switches.

2. The method of simultaneously testing a plurality of switches, each of the switches having a pair of contact elements operable for making and breaking electrical contact with one another, which method comprises the steps of:
   connecting the switches in a series array so that when all of the switches are operated concurrently to close their respective pairs of contact elements a series circuit is completed through the closed pairs of contact elements;
   operating the switches to close their respective pairs of contact elements to complete the series circuit;
   passing a test current for a predetermined test interval through the serially connected contact elements so that each pair of contact elements is tested under identical current conditions;
   operating each of the switches so as normally to cause the opening of the respective contact elements;
   connecting the switches in a parallel array and impressing a potential across the parallel array of switches; and
   monitoring the parallel array of switches to sense any flow of current indicative of a failure of at least one pair of contact elements to open.

3. The method of simultaneously testing a plurality of switches, each of the switches having a pair of contact elements operable for making and breaking electrical contact with one another, which method comprises the steps of:
   connecting the switches in a series array so that when all of the switches are operated concurrently to close their respective pairs of contact elements a series circuit is completed through the closed pairs of contact elements;
   operating the switches to close their respective pairs of contact elements to complete the series circuit;
   passing a test current for a predetermined test interval through the serially connected contact elements so that each pair of contact elements is tested under identical current conditions;
   operating each of the switches so as normally to cause the opening of the respective contact elements;
   connecting the switches in a parallel array and impressing a potential across the parallel array of switches;
   monitoring the parallel array of switches to sense any flow of current indicative of a failure of at least one pair of contact elements to open;
   recycling to repeat all of the preceding steps in the same sequence in the event that no failure is detected; and
   repeating the recycling step for a predetermined number of cycles unless a failure is detected before said predetermined number of cycles has been completed.

4. Apparatus for simultaneously testing a plurality of switches, each of the switches having a pair of contact elements operable for making and breaking electrical contact with one another, which apparatus comprises:
   means for connecting the switches to be tested in a series array so that when all of the switches are operated concurrently to close their respective pairs of contact elements a series circuit is completed through the closed contact elements;
   means for operating the switches to the condition wherein the respective contact elements of the switches are closed and the series circuit is completed;
   a power supply;
   means for connecting the series array of switches to the power supply so as to pass a predetermined test current through the serially connected pairs of closed contact elements;
   means actuated after a predetermined time interval for placing all of the switches under test in the condition wherein their respective contact elements normally are open;
   means for connecting the switches and their respective pairs of contact elements in a parallel array and for connecting said parallel array of switches and contact elements to the power supply so that a potential is impressed across the parallel array of contact elements; and
   means for detecting any flow of current across the parallel array of switches, such current being indicative of a failure of at least one of the switches to open due to a fusing of a pair of contact elements subjected to said predetermined test current.

5. Apparatus for simultaneously testing a plurality of switches, each of the switches having a pair of contact elements operable for making and breaking electrical contact with one another, which apparatus comprises:
   means for normally connecting the switches to be tested in a series array so that when all of the switches are operated concurrently to close their respective pairs of contact elements a series circuit is completed through the closed contact elements;

means operable when said switches are connected in said series array for sequentially closing and opening the respective contact elements of said switches;

means operable when the contact elements of said switches are closed for passing a predetermined test current through the serially connected pairs of closed contact elements;

means selectively operable for connecting the switches in a parallel array and for applying a voltage across the parallel array of switches;

means for detecting any flow of current across the parallel array of switches, such current being indicative of a failure of at least one of the switches to open due to a fusing of a pair of contact elements subjected to said predetermined test current; and means for operating cyclically said sequential closing and opening means, said current passing means and said parallel connecting and voltage applying means in a predetermined sequence, said cyclically operating means repetitively operating said latter-mentioned means for a predetermined number of cycles unless a failure is detected before said predetermined number of cycles has been completed.

6. Apparatus for simultaneously testing a plurality of electrical components for a change in a predetermined characteristic which comprises:

means for normally connecting a plurality of components to be tested in electrical series with one another;

a plurality of selectively operable relays having contacts connected to all of said components for connecting said components in electrical parallel with one another when the relays are operated and to leave said components connected in electrical series with one another when the relays are unoperated;

means selectively operable for passing a predetermined test current through said components when they are connected in electrical series with one another;

means selectively operable for applying a voltage to said components when they are connected in electrical parallel with one another, the amount of current passing through said parallelly connected components depending upon the effect of the test current in said components;

means responsive to a predetermined amount of current passing through said components when they are connected in parallel with one another for indicating a change in said predetermined characteristic; and means for selectively operating said relays, said current passing means and said voltage applying means in a predetermined sequence.

7. Apparatus for simultaneously testing a plurality of electrical components for a change in a predetermined characteristic, which comprises:

means for normally connecting a plurality of components to be tested in electrical series with one another;

a plurality of selectively operable relays having contacts connected to all of said components for connecting said components in electrical parallel with one another when the relays are operated and to leave said components connected in electrical series with one another when the relays are unoperated;

means including a selectively operable relay for passing a predetermined test current through said components when they are connected in electrical series with one another;

means including a selectively operable relay for applying a voltage to said components when they are connected in electrical parallel with one another, the amount of current passing through said parallelly connected components depending upon the effect of said test current on said components;

means responsive to a predetermined amount of current passing through said components when they are connected in parallel with one another for indicating a change in said predetermined characteristic; and means for selectively operating said component-paralleling relays, said current passing relay and said voltage applying relay in a predetermined sequence.

8. Apparatus according to claim 7 in which said selectively operating means includes a cold-cathode, gas discharge stepping tube having a plurality of output and stepping cathodes and a cooperating anode.

9. Apparatus according to claim 8 in which said current passing relay and said voltage applying relay are of the polarized magnetic latching type and are each provided with multiple operating coils, said operating coils being connected to different output cathodes of said cold-cathode, gas discharge stepping tube.

10. Apparatus for simultaneously testing a plurality of electrical components, which comprises:

means for normally connecting a plurality of components to be tested in electrical series with one another;

a plurality of selectively operable relays having contacts connected to said components in a manner such as to connect said components in electrical parallel with one another when the relays are operated and to leave said components connected in electrical series with one another when the relays are unoperated;

a cold-cathode, gas discharge stepping tube having a plurality of output and stepping cathodes and a cooperating anode, said stepping cathodes being connected together and said output cathodes being connected to respective normally closed circuits;

a pulse source connected to said stepping cathodes for applying glow transferring pulses thereto, said pulse source having an output impedance between pulses of a value which will support a glow discharge between the anode and a stepping cathode;

a first latching relay having first and second operating coils connected in first and second output cathode circuits, respectively, of said stepping tube and contacts connected to said parallel connecting relays, each of said operating coils being energized when the glow is at the output cathode associated therewith, said first operating coil when energized causing de-energization of said parallel connecting relays and said second operating coil when energized causing energization of said parallel connecting relays;

current applying means;

a second latching relay having first and second operating coils connected to third and fourth cathode circuits, respectively, of said stepping tube and contacts connected to said current applying means, each of said operating coils being energized when the glow is at the output cathode associated therewith, the output cathode of said third and fourth cathode circuits being energized after transfer of the glow to the output cathode of said first cathode circuit but prior to transfer of the glow to the output cathode of said second cathode circuit, said first operating coil when energized causing connection of said current applying means to said components to pass a predetermined current therethrough and said second operating coil when energized causing disconnection of said current applying means from said components;

voltage applying means;

a third latching relay having a first and second operating coils connected to fifth and sixth cathode circuits, respectively, of said stepping tube and contacts connected to said voltage applying means, each of said operating coils being energized when the glow is at the output cathode associated therewith, the output cathode of said fifth and sixth cathode circuits being energized after transfer of the glow to the output cathode of said fourth cathode, said first operating coil when energized causing connection of said voltage applying means to said component, the amount of current passing therethrough depending upon a condition of said components and said second operating coil when energized causing disconnection of said voltage applying means from said components; and means responsive to a predetermined amount of current passing through said components when the voltage applying means is connected thereto for opening the first output cathode circuit.

11. The method of simultaneously testing a plurality of electromagnetic relays, wherein each relay comprises an energizing coil and a pair of normally open contacts which are closed upon energization of the coil and which may fuse together upon subjection to a predetermined test current, which comprises:

connecting said normally open contacts in electrical series;

energizing said coils to close said contacts;

passing said predetermined test current through said contacts;

de-energizing said coils to restore those contacts that have not fused, to said normally open positions;

subsequently placing said contacts in electrical parallel relationship;

applying a voltage to said contacts connected in parallel relationship; and then, detecting current flow through any of the fused contacts.

12. Apparatus for simultaneously testing a plurality of electromagnetic relays, wherein each relay comprises an energizing coil and a pair of normally open contacts which are closed upon energization of the coil and which may fuse together upon subjection to a predetermined test current, which comprises:

means for sequentially placing said normally open contacts in electrical series and then in electrical parallel relationship;

means rendered effective when said relays are connected in series for sequentially energizing and then de-energizing said coils of said relays to open and then close the contacts thereof;

a power supply rendered effective upon energization of the coils for passing a predetermined test current through said closed series connected contacts and for applying a voltage across said contacts when said contacts are in parallel; and means operative while the contacts are connected in parallel and subject to said voltage for detecting current flow through any of said contacts which were fused when subjected to said test current.

References Cited

UNITED STATES PATENTS

| | | | |
|---|---|---|---|
| 2,687,496 | 8/1954 | Wales | 315—84.6 |
| 2,975,338 | 3/1961 | Bivens | 315—84.6 |
| 3,217,243 | 11/1965 | Franklin | 324—28 |

RUDOLPH V. ROLINEC, *Primary Examiner.*

E. L. STOLARUN, *Assistant Examiner.*